(12) United States Patent
Heo

(10) Patent No.: US 7,719,513 B2
(45) Date of Patent: May 18, 2010

(54) LCD DRIVING INVERTER AND PORTABLE COMPUTER WITH THE SAME

(75) Inventor: Jong-myung Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 924 days.

(21) Appl. No.: 11/514,832

(22) Filed: Sep. 5, 2006

(65) Prior Publication Data

US 2007/0052877 A1    Mar. 8, 2007

(30) Foreign Application Priority Data

Sep. 6, 2005    (KR) .................. 10-2005-0082743

(51) Int. Cl.
*G02F 1/133* (2006.01)
(52) U.S. Cl. ..................................... 345/102
(58) Field of Classification Search .................. 345/102
See application file for complete search history.

(56) References Cited

U.S. PATENT DOCUMENTS

| 2002/0111055 | A1* | 8/2002 | Matsumura et al. | ........... 439/91 |
| 2002/0191126 | A1* | 12/2002 | Sasuga et al. | ................ 349/58 |
| 2003/0102776 | A1 | 6/2003 | Takeda et al. | |
| 2005/0128377 | A1* | 6/2005 | Park et al. | .................. 349/61 |
| 2006/0203014 | A1* | 9/2006 | Lev et al. | ................... 345/659 |

FOREIGN PATENT DOCUMENTS

| CN | 1402600 | 3/2003 |
| KR | 2004-21891 | 3/2004 |
| KR | 2004-32476 | 4/2004 |
| KR | 2004-56117 | 6/2004 |

OTHER PUBLICATIONS

Chinese Office Action dated Feb. 29, 2008.

* cited by examiner

*Primary Examiner*—Richard Hjerpe
*Assistant Examiner*—Priyank Shah
(74) *Attorney, Agent, or Firm*—Jefferson IP Law, LLP

(57) ABSTRACT

An LCD driving inverter to drive a plurality of lamps mounted in an LCD module, includes: a main substrate having an input part connected to an external power source, a conversion circuit converting a direct current provided from the input part into an alternating current, a first transformer connected to the conversion circuit to convert voltage from the conversion circuit and a first output part providing the voltage from the first transformer to at least one of a plurality of lamps; a subsidiary substrate including a second transformer connected to the conversion circuit to convert the voltage from the conversion circuit and a second output part providing the voltage from the second transformer to at least another one of the plurality of lamps; and at least one spacing member disposed between the main substrate and the subsidiary substrate so that the subsidiary substrate is mounted to be spaced from a surface of the main substrate. Thus, the LCD driving inverter and a portable computer including the inverter having a plurality of output parts is minimized in the width dimension.

17 Claims, 5 Drawing Sheets

LCD DRIVING INVERTER AND PORTABLE COMPUTER WITH THE SAME

CROSS-REFERENCE TO RELATED APPLICATION

This application claims the benefit of Korean Patent Application No. 2005-82743, filed on Sep. 6, 2005, in the Korean Intellectual Property Office, the disclosure of which is incorporated herein by reference.

BACKGROUND OF THE INVENTION

1. Field of the Invention

An aspect of the present invention relates to a liquid crystal display (LCD) driving inverter and a portable computer with the same, and more particularly, to an LCD driving inverter and a portable computer with the same including an improved configuration having a plurality of output units.

2. Description of the Related Art

Generally, an LCD driving inverter is connected to a lamp mounted in an LCD module to drive the lamp. The LCD module includes an LCD panel forming an image and a backlight unit disposed in back of the LCD panel and including a lamp to provide light to the LCD panel. If the LCD module employs a large-sized LCD panel, a plurality of lamps is needed to provide sufficient light to the large-sized LCD panel.

An LCD module comprising a plurality of lamps is disclosed in Korea Patent Application No. 10-2002-0053540. This conventional LCD module includes a plurality of lamps to provide light to an LCD panel and a plurality of inverters connected to each of the lamps in series so as to drive the lamps.

However, since the conventional LCD module includes the plurality of inverters, it may be difficult to assemble the LCD module and may increase in volume.

Specifically, in the case that the LCD module is mounted in a portable computer, it may be difficult to decrease the thickness of the portable computer.

SUMMARY OF THE INVENTION

Accordingly, it is an aspect of the present invention to provide an LCD driving inverter and a portable computer including the LCD driving inverter which includes a plurality of output parts and is minimized in width so as to be slim without difficulties.

The foregoing and/or other aspects of the present invention are achieved by providing an LCD driving inverter to drive a plurality of lamps mounted in an LCD module, including: a main substrate including an input part connected to an external power source, a conversion circuit converting a direct current provided from the input part into an alternating current, a first transformer connected to the conversion circuit to convert voltage from the conversion circuit and a first output part providing the voltage from the first transformer to at least one of the plurality of the lamps; a subsidiary substrate including a second transformer connected to the conversion circuit to convert the voltage from the conversion circuit and a second output part providing the voltage from the second transformer to at least another of the plurality of the lamps; and at least one spacing member disposed between the main substrate and the subsidiary substrate so that the subsidiary substrate is mounted to be spaced from a surface of the main substrate.

According to another embodiment of the present invention, the voltage transmitted from the conversion circuit is transmitted to the second transformer through the spacing member.

According to another embodiment of the present invention, the main substrate and the subsidiary substrate are formed lengthwise.

According to another embodiment of the present invention, a coupling part is provided on the main substrate so that the main substrate is supported in an electronic device mounted with the LCD module.

The foregoing and/or other aspects of the present invention are also achieved by providing a portable computer where an LCD module forming an image is mounted, including: an LCD driving inverter to drive a plurality of lamps mounted in the LCD module, wherein the inverter includes a main substrate having an input part connected to an external power source, a conversion circuit converting a direct current provided from the input part into an alternating current, a first transformer connected to the conversion circuit to convert voltage from the conversion circuit and a first output part providing the voltage from the first transformer to at least one of the plurality of the lamps; a subsidiary substrate including a second transformer connected to the conversion circuit to convert the voltage from the conversion circuit and a second output part providing the voltage from the second transformer to at least another of the plurality of the lamps; and at least one spacing member disposed between the main substrate and the subsidiary substrate so that the subsidiary substrate is mounted to be spaced from a surface of the main substrate.

According to another embodiment of the present invention, the voltage transmitted from the conversion circuit is transmitted to the second transformer through the spacing member.

According to another embodiment of the present invention, the main substrate and the subsidiary substrate are formed lengthwise.

According to another embodiment of the present invention, the portable computer further includes a display where the LCD module is mounted and a computer main body supporting the display so as to rotate, wherein a coupling part is provided on the main substrate so as to mount the inverter in the display.

According to another embodiment of the present invention, the inverter is mounted in a side of the LCD module so that a surface of the main substrate faces a lateral side of the LCD module.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
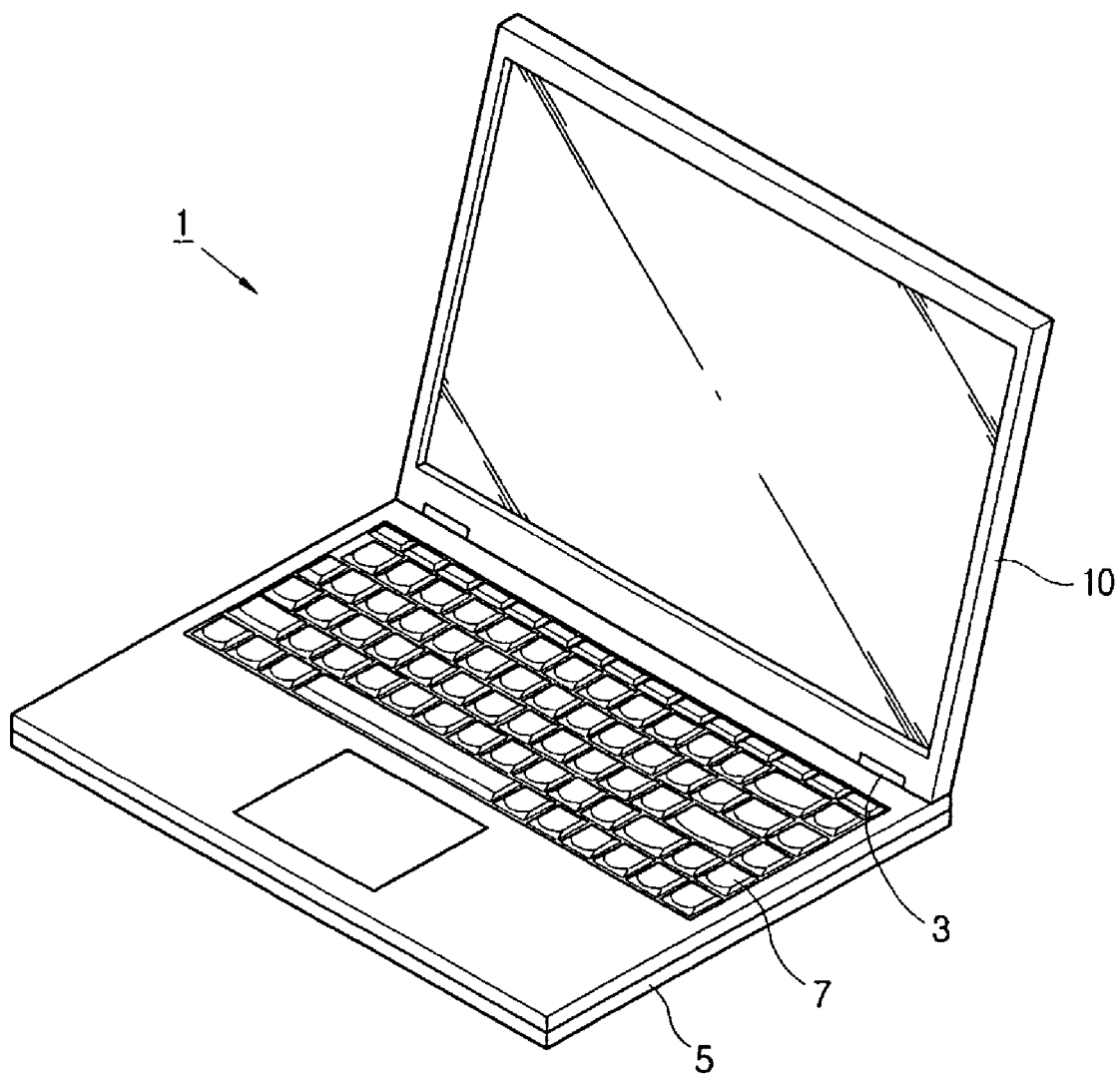
FIG. 1 is a perspective view of a portable computer according to an embodiment of the present invention.
Figure 2:
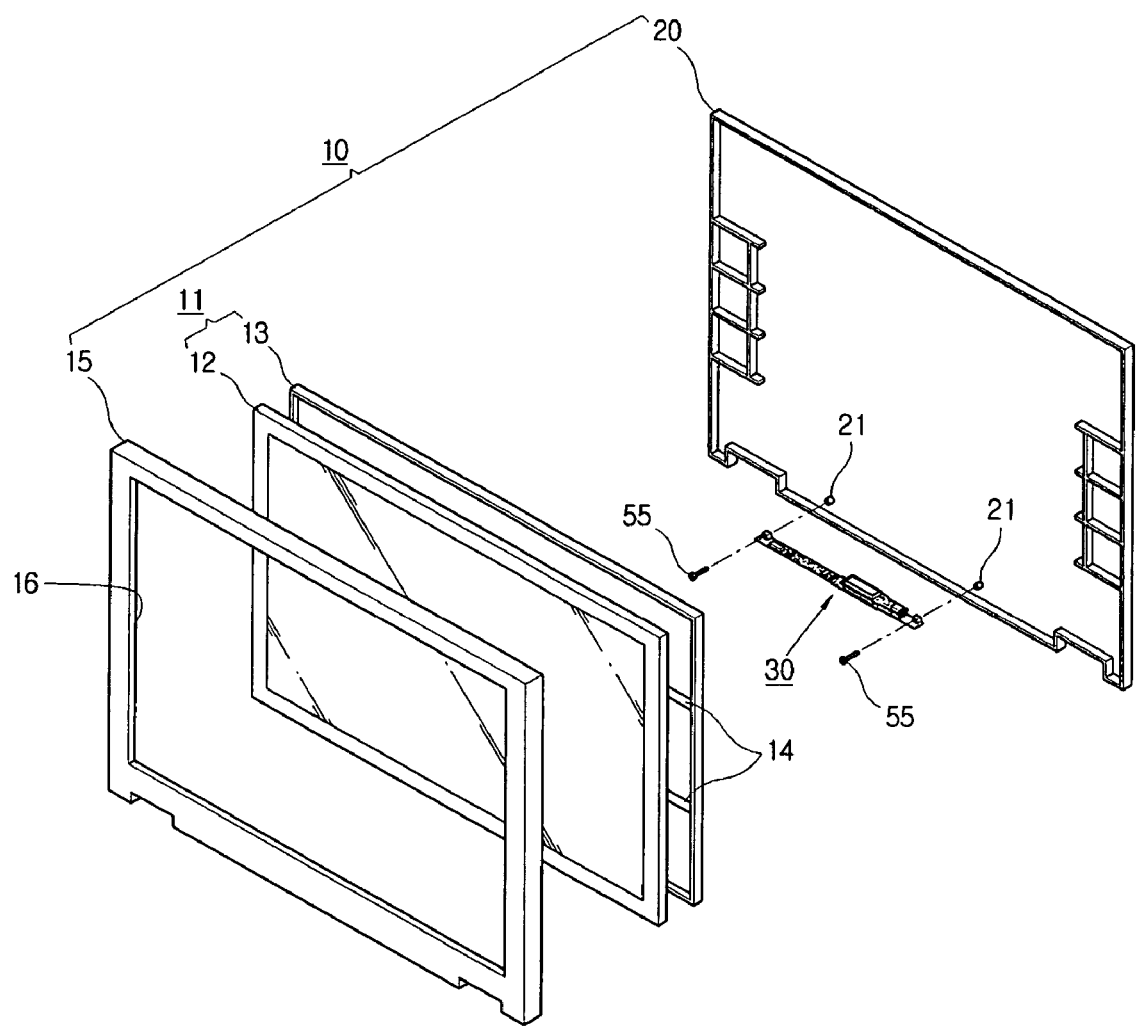
FIG. 2 is an exploded view of the portable computer according to an embodiment of the present invention.

Reference will now be made in detail to embodiments of the present invention, examples of which are illustrated in the accompanying drawings, wherein like reference numerals refer to like elements throughout. The embodiments are described below in order to explain the present invention by referring to the figures.

Referring to FIGS. 1 through 5, an aspect of the present invention will be described as follows. As shown in FIGS. 1 through 5, a portable computer 1 according to an embodiment of the present invention includes a computer main body 5 and a display 10 rotatably combined with the computer main body 5.

The computer main body 5 includes an electronic component (not shown) such as a central processing unit (CPU) and a memory unit mounted therein and an input unit such as a keyboard 7. The computer main body 5 is rotatably combined with the display 10 by a hinge 3.

The display 10 includes an LCD module 11, a front cover 15 and a back cover 20. The LCD module 11 is disposed between the front cover 15 and the back cover 20 and forms an image. The front cover 15 is disposed in front of the LCD module 11 and the back cover 20 is disposed in back of the LCD module 11. The display 10 includes an LCD driving inverter 30 driving a plurality of lamps 14 which are mounted in the LCD module 11.

The LCD module 11, according to an embodiment of the present invention, includes an LCD panel 12 forming a large screen and a backlight unit 13 disposed in back of the LCD panel 12 and providing light to the LCD panel 12. The LCD panel 12 uses the plurality of lamps 14 as a light source and forms a screen of 19 inches or more. However, these elements can be used to form a screen smaller than 19 inches, such as one of 17 inches. The backlight unit 13 includes the plurality of lamps 14, which are spaced from each other, to provide light to the LCD panel 12.

The front cover 15 includes an opening 16 to expose a picture area of the LCD panel 12. The front cover 15 blocks the edges of the LCD panel 12 and is combined with the back cover 20.

The back cover 20 includes a plurality of bosses 21 combined with the inverter 30 by screws 55 thereon. However, the bosses 21 may be provided on the front cover 15.

The inverter 30 includes a main substrate 31, at least one subsidiary substrate 41 and a spacing member 51. The main substrate 31 converts electric power provided from the outside and provides the power to at least one of the plurality of the lamps 14. The subsidiary substrate 41 receives the electric power from the main substrate 31 and provides the power to one of the plurality of the lamps 14. The spacing member 51 is disposed between the main substrate 31 and the subsidiary substrate 41 so that the subsidiary substrate 41 is disposed over the main substrate 31 in a horizontal direction and spaced from the main substrate 31. The inverter 30 is combined with the bosses 21 by the screws 55. However, the inverter 30 is not be limited thereto, and may be combined with the bosses 21 by a hook, or may be combined therewith by an inner surface of the back cover 20 or the front cover 15 melted in the case that the inner surface comprises plastic.

The main substrate 31 includes: an input part 33 connected to an external power source; a conversion circuit 34 converting a direct current transmitted from the input part 33 into an alternating current; a first transformer 35 connected to the conversion circuit 34 and converting voltage transmitted from the conversion circuit 34; and a first output part 36 providing the voltage transmitted from the first transformer 35 to at least one of the plurality of the lamps 14. The main substrate 31 includes a main substrate body 32 which is formed lengthwise. The main substrate 31 includes a coupling part 37 to mount the inverter 30 in the display 10.

The input part 33 is disposed in the main substrate body 32 and connected to the computer main body 5 to be supplied with the electric power provided from the outside therethrough. Since the outside electric power is an alternating current, it is converted into a direct current with an AC-DC converter before being provided to the computer main body 5. However, the AC-DC converter may be mounted in the computer's main body 5. The input part 33 is provided in the form of a connector type so as to be combined with an electric power cable (not shown) connected to the computer main body 5, or may be soldered with the electric power cable.

The conversion circuit 34 is disposed on the main substrate body 32 to be electrically connected to the input part 33 and converts the direct current transmitted from the input part 33 into an alternating current.

The first transformer 35 is disposed on the main substrate body 32 to be electrically connected to the conversion circuit 34 and converts voltage transmitted from the conversion circuit 34 so as to drive the lamps 14.

The first output part 36 is disposed on the main substrate body 32 to be electrically connected to the first transformer 35 and is connected to an electric power cable of the lamp 14 so as to transmit the voltage from the first transformer 35 to the lamp 14. The first output part 36 is formed in a connector type to be combined with the electric power cable which is connected to the lamp 14. However, the first output part 36 may be soldered with the electric power cable to the lamp 14.

The coupling part 37 is provided on the main substrate body 32 at various locations so as to be combined with the bosses 21 of the back cover 20 by the screws 55. The coupling part 37 protrudes from the main substrate body 32 so that a surface of the main substrate 31 of the inverter 30 may be mounted in one side of the LCD module 11 toward a lateral side of the LCD module 11. Accordingly, the inverter 30 may be mounted inside the display 10 so that a surface of the main substrate 31 is disposed in a lower part of the LCD module 11 and faces the LCD module 11, as an example in an embodiment of the present invention.

The subsidiary substrate 41 includes: a second transformer 45 connected to the conversion circuit 34 of the main substrate 31 and converting the voltage transmitted from the conversion circuit 34; and a second output part 46 providing the voltage transmitted from the second transformer 45 to at least another one of the plurality of the lamps 14. The subsidiary substrate 41 includes a subsidiary substrate body 42 which is formed lengthwise. In an embodiment of the present invention, the subsidiary substrate 41 is disposed over the main substrate 31. However, the subsidiary substrate 41 may be disposed under the main substrate 31, or disposed both over and under the main substrate 31. Further, various subsidiary substrates 41 may be provided and disposed over or under the main substrate 31 spaced from each other by the spacing member 51.

The second transformer 45 is provided on the subsidiary substrate body 42 to be electrically connected to the conversion circuit 34 and converts the voltage from the conversion circuit 34 so as to drive the lamps 14 which are not connected to the first output part 36.

The second output part 46 is provided on the subsidiary substrate body 42 to be electrically connected to the second transformer 45 and is connected to the electric power cable of the lamp 14 so as to transmit the voltage from the second transformer 45 to the lamps 14 which are not connected to the first output part 36. The second output part 46 is provided in a connector type so as to be combined with the electric power cable connected to the lamp 14 which is not connected to the first output part 36. However, the second output part 46 may be soldered with the electric power cable of the lamp 14.

The spacing member 51 is disposed at various locations between the main substrate body 32 and the subsidiary substrate body 42 so as to space the main substrate body 32 from the subsidiary substrate body 42 at a predetermined interval. The spacing member 51 includes a conductive material in order to transmit the voltage from the conversion circuit 34 to the second transformer 45. A lower portion of the spacing member 51 is supported by the main substrate body 32 and an upper portion of the spacing member 51 contacts with a lower surface of the subsidiary substrate body 42 and is supported thereby. The spacing member 51 may be screwed or soldered with the main substrate body 32. Also, the spacing member 51 may be screwed or soldered with the subsidiary substrate body 42.

With this configuration, a process of mounting the inverter 30 in the portable computer 1 according to an embodiment of the present invention will be described as follows.

The surface of the main substrate body 32 of the inverter 30 is disposed in the back cover 20 so as to face the lower surface of the LCD module 11. Then, the coupling part 37 of the inverter 30 is combined with the bosses 21 of the back cover 20 by the screws 55. Herein, the subsidiary substrate 41 is disposed over the main substrate 31 in the inverter 30, so that the height of the inverter 30 increases, while the width thereof is prevented from increasing. Accordingly, the thickness of the display 10 where the inverter 30 is mounted may be prevented from increasing. Further, the inverter 30 is formed in one piece to be mounted in the display 10 without difficulties as compared with the plurality of inverters mounted therein.

Figure 3:
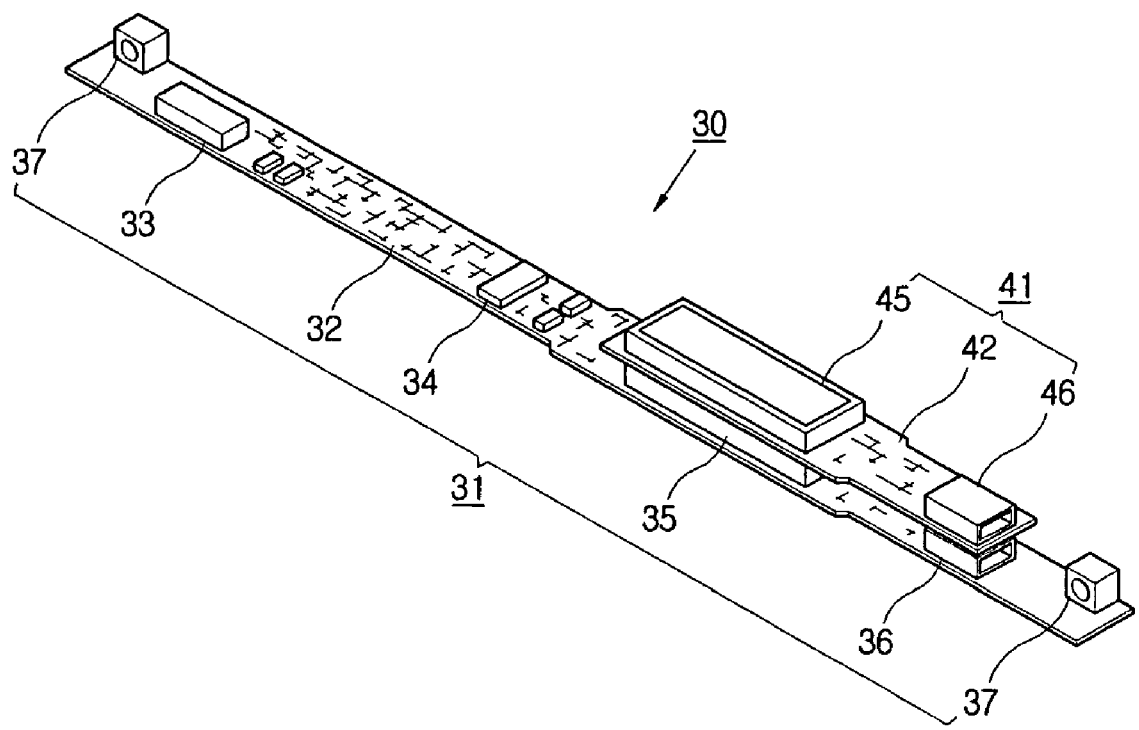
FIGS. 3 and 4 are a perspective view and a front view of an inverter mounted in the portable computer in FIG. 2.
Figure 4:
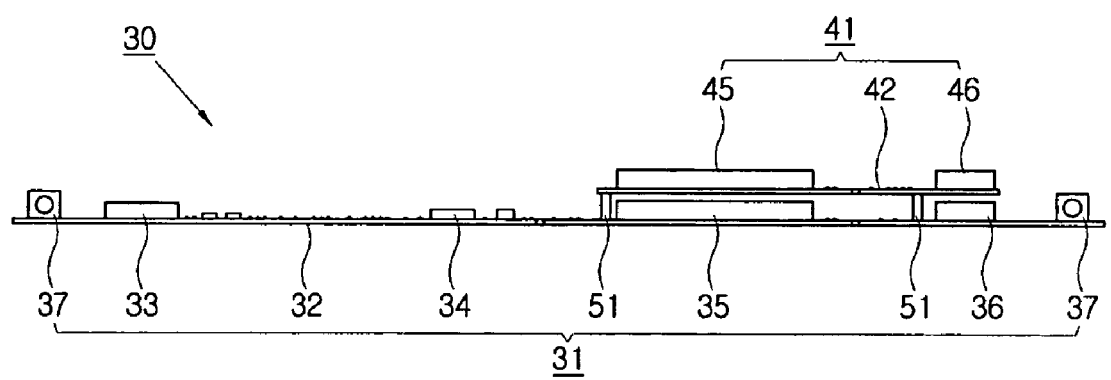

Thus, as shown in FIGS. 3 and 4, the inverter 30 mounted in the portable computer 1 according to an embodiment of the present invention is formed in a lengthwise direction more than in a widthwise direction and the subsidiary substrate 41 is mounted over the main substrate 31 in a horizontal direction of the surface of the main substrate 31, thereby preventing the width of the inverter from increasing. Accordingly, the thickness of the display 10 is prevented from increasing as well.

Further, the inverter 30 is provided in one piece or configuration including the plurality of output parts 36 and 46 to drive the plurality of the lamps 14, thereby being mounted in the display 10 without difficulties.

Also, the inverter 30 uses one conversion circuit 34 to provide an alternating current to the first transformer and the second transformer, thereby simplifying a configuration thereof.

Figure 5:
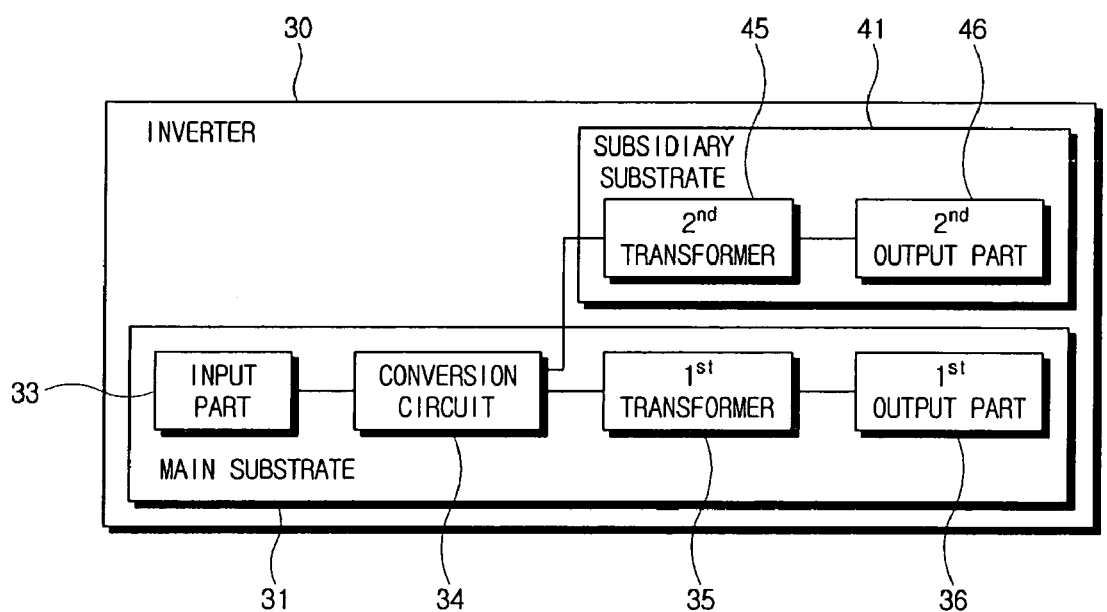
FIG. 5 is a control block diagram of the inverter mounted in the portable computer according to an embodiment of the present invention.

FIG. 5 is a control block diagram of the inverter mounted in the portable computer according to an embodiment of the present invention. As illustrated in FIG. 5, a substrate 31, an input part 33, a conversion circuit 34, a first transformer 35 and a first output 36 are mounted on the main substrate 31 or a first substrate. Furthermore, a second transformer 45 and a second output part 46 are mounted on the subsidiary substrate 41 or a second substrate.

Although a few embodiments of the present invention have been shown and described, it will be appreciated by those skilled in the art that changes may be made in this embodiment without departing from the principles and spirit of the invention, the scope of which is defined in the claims and their equivalents.

What is claimed is:

1. An LCD driving inverter to drive a plurality of lamps mounted in an LCD module, comprising:
   a main substrate comprising an input part connected to an external power source, a conversion circuit converting a direct current provided from the input part into an alternating current, a first transformer connected to the conversion circuit to convert voltage from the conversion circuit and a first output part providing the voltage from the first transformer to at least one of the plurality of lamps;
   a subsidiary substrate comprising a second transformer connected to the conversion circuit to convert the voltage from the conversion circuit and a second output part providing the voltage from the second transformer to at least another one of the plurality of lamps; and
   at least one spacing member disposed between the main substrate and the subsidiary substrate so that the subsidiary substrate is mounted to be spaced from a surface of the main substrate.

2. The LCD driving inverter according to claim 1, wherein the voltage transmitted from the conversion circuit to the second transformer is transmitted through the spacing member.

3. The LCD driving inverter according to claim 1, wherein the main substrate and the subsidiary substrate are formed lengthwise.

4. The LCD driving inverter according to claim 1, wherein a coupling part is provided on the main substrate so that the main substrate is supported in an electronic device mounted with the LCD module.

5. A portable computer where an LCD module forming an image is mounted, comprising:
   an LCD driving inverter to drive a plurality of lamps mounted in the LCD module,
   wherein the LCD driving inverter comprises a main substrate comprising an input part connected to an external power source, a conversion circuit converting a direct current provided from the input part into an alternating current, a first transformer connected to the conversion circuit to convert voltage from the conversion circuit and a first output part providing the voltage from the first transformer to at least one of the plurality of lamps; a subsidiary substrate comprising a second transformer connected to the conversion circuit to convert the voltage from the conversion circuit and a second output part providing the voltage from the second transformer to at least another one of the plurality of lamps; and at least one spacing member disposed between the main substrate and the subsidiary substrate so that the subsidiary substrate is mounted to be spaced from a surface of the main substrate.

6. The portable computer according to claim 5, wherein the voltage transmitted from the conversion circuit is transmitted to the second transformer through the spacing member.

7. The portable computer according to claim 5, wherein the main substrate and the subsidiary substrate are formed lengthwise.

8. The portable computer according to claim 5, further comprising a display where the LCD module is mounted and a computer main body supporting the display so as to rotate, and providing a coupling part on the main substrate so as to mount the LCD driving inverter in the display.

9. The portable computer according to claim 8, wherein the LCD driving inverter is mounted in a side of the LCD module so that a surface of the main substrate faces a lateral side of the LCD module.

10. An LCD driving inverter to drive a plurality of lamps mounted in an LCD module, the LCD driving inverter comprising:

a first substrate comprising an input part connected to an external power source and a first output part providing voltage from the input part to at least one of the plurality of lamps; and;

a second substrate mounted on the first substrate, providing the voltage to at least another one of the plurality of lamps, wherein the second substrate has a substantially similar width as the first substrate preventing the width of the LCD driving inverter from increasing.

11. The LCD driving inverter according to claim 10, wherein the first substrate further comprises a conversion circuit converting a direct current provided from the input part into an alternating current, and a first transformer connected to the conversion circuit to convert the voltage from the conversion circuit.

12. The LCD driving inverter according to claim 11, wherein the second substrate further comprises a second transformer connected to the conversion circuit to convert the voltage from the conversion circuit and a second output part providing the voltage from the second transformer to the at least another one of the plurality of lamps; and at least one spacing member disposed between the first substrate and the second substrate so that the second substrate is mounted to be spaced from a surface of the first substrate.

13. The LCD driving inverter according to claim 12, wherein the voltage transmitted from the conversion circuit to the second transformer is transmitted through the spacing member.

14. The LCD driving inverter according to claim 10, further comprising a coupling part is provided on the first substrate so that the first substrate is supported in an electronic device mounted with the LCD module.

15. The LCD driving inverter according to claim 12, wherein the spacing member includes a conductive material.

16. The LCD driving inverter according to claim 12, wherein the spacing member is supported by the first substrate and an upper portion of the spacing member contacts a lower surface of the second substrate.

17. The LCD driving inverter according to claim 10, wherein the inverter is formed in one piece including a plurality of output parts to drive the plurality of lamps.

* * * * *